United States Patent [19]

Rhodes

[11] Patent Number: 5,434,553
[45] Date of Patent: Jul. 18, 1995

[54] BLACK-OUT CONTROLLER SYSTEM

[76] Inventor: Michael E. Rhodes, 417 Woodland La., Grand Rapids, Minn. 55744

[21] Appl. No.: 77,094

[22] Filed: Jun. 16, 1993

[51] Int. Cl.⁶ .............................................. B60Q 1/00
[52] U.S. Cl. .................................. 340/468; 340/463; 340/471; 340/472; 340/479; 307/10.8
[58] Field of Search .............. 340/468, 471, 463, 472, 340/479; 307/10.8

[56] References Cited

U.S. PATENT DOCUMENTS

| | | | |
|---|---|---|---|
| 3,697,946 | 10/1972 | Nishioka | 340/478 |
| 4,037,195 | 7/1977 | Wojslawowicz | 340/471 |
| 4,249,160 | 2/1981 | Chilvers | 340/471 |
| 4,670,736 | 6/1987 | Ulrich | 307/10.8 |
| 4,678,925 | 7/1987 | Grocke | 307/10.8 |
| 4,812,808 | 3/1989 | Ulrich | 340/471 |
| 4,845,465 | 7/1989 | Kruse et al. | 340/468 |
| 4,859,988 | 8/1989 | Holtvluwer | 340/471 |
| 4,939,503 | 7/1990 | Swanson | 340/431 |
| 5,081,565 | 1/1992 | Nabha et al. | 307/10.8 |

Primary Examiner—John K. Peng
Assistant Examiner—Edward Lefkowitz
Attorney, Agent, or Firm—Richard C. Litman

[57] ABSTRACT

A black-out controller system includes a harness attachable to the lighting system of a conventional vehicle. A controller is attachable to the harness for controlling the various lighting features of the vehicle. An illuminated switch panel located within the passenger compartment allows the driver to alter the normal lighting features of the vehicle. A brake and backup lights black-out switch is provided on the switch panel which disables the brake and backup lights of the vehicle. A tail lights black-out switch is also provided to disable the tail lights. A sneak light switch is provided to activate a sneak light located in front of the vehicle which may be used to provide less lighting in front of the vehicle than the normal headlights. Optional flashing features of emergency lights may be included in the black-out controller system.

8 Claims, 6 Drawing Sheets

BLACK-OUT CONTROLLER SYSTEM

BACKGROUND OF THE INVENTION

1. Field of the Invention

The present invention relates to lighting control systems to be installed within conventional vehicles for altering the control of the lighting features of the vehicle. More particularly, the present invention pertains to those lighting control systems to be installed within conventional vehicles for blacking-out brake lights, tail lights, back-up lights, and certain interior lights to render the vehicle less visible to those outside the vehicle.

2. Description of the Prior Art

Lighting control devices for altering the conventional lighting features of a conventional vehicle are located between the conventional switching arrangements of the vehicle, such as the running lights switch, the high beam switch, etc., and the lights under their control. These devices allow for special lighting features to be added to the conventional lighting features of the vehicle. Some of the devices allow for an override of the special lighting features to allow the lighting features to operate in the conventional manner when desired by the user.

U.S. Pat. No. 3,697,946 issued Oct. 10, 1972 to Kenichi Nishioka discloses a lighting control device for altering the turn signal lighting feature of a vehicle. When activated, the device sequentially activates a series of tail lights for indicating the direction of a turn. Upon activation of an emergency switch, intermittent power is sent to the left and right front lights as well as the left and right rear lights causing these lights to alternately flash on and off.

U.S. Pat. No. 4,845,465 issued Jul. 4, 1989 to James W. Kruse et al discloses a multiplexed lighting control system for reducing the amount of wiring needed to operate the lighting features of the vehicle.

U.S. Pat. No. 4,859,988 issued Aug. 22, 1989 to Douglas C. Holtvluwer discloses a separate and independent vehicle exterior light flashing unit for use with a conventional vehicle.

None of the above inventions and patents, taken either singly or in combination, is seen to describe the instant invention as claimed.

SUMMARY OF THE INVENTION

The device of the present invention includes a black-out controller having a wiring harness insertable within the conventional vehicle. The wiring harness is inserted within the already existing wiring arrangement of the vehicle controlling the various lighting features of the vehicle. Attachable to the wiring harness is a control unit which, under the control of a switching panel located within easy reach of the driver, may interrupt certain lighting features of the vehicle. More particularly, certain lighting features are blacked out in order to render the vehicle or its operations less evident to others outside the vehicle, and inside the vehicle to eliminate glare on officer's eyes from radio and heater control lights located within the dashboard. This device is intended for use in emergency vehicles, particularly police squad cars.

At the discretion of a trained professional, the operations of the vehicle may be made less apparent to those outside the vehicle. This may prove useful under certain situations. For example, if a squad car passes a suspect in a parked car at night, the officer would have several additional options to investigate, without the suspect knowing it. The officer could (a) prevent the brake, dome, and backup lights from coming on so as to allow the officer to back up his squad car without detection; (b) stop the squad car, let his partner out of the squad car, and go on foot to investigate, or; (c) drive out of view after passing the suspect, blackout all his lights, and turn on his sneak light, thereby allowing him to pull up to the parked car without detection and turn on the police emergency lights to catch the suspect off guard. Since each of these features, brake lights, running lights, and backup lights, are placed within vehicles to insure safe driving, operation of the black-out controller should only be used at the discretion of trained professionals.

Accordingly, it is a principal object of the present invention to provide a lighting control system insertable within the conventional vehicle which blacks-out certain lighting features of emergency vehicle, such as police squad cars, for rendering the vehicle less visible to others outside the vehicle.

It is an object of this invention to override said means for disabling black-out lights upon activation of the manually activated emergency light switch.

It is another object of the invention to provide such a black-out controller system which is insertable within already existing conventional vehicles.

It is a further object of the invention to provide such black-out controller system which comprises a wiring harness, insertable within the vehicle, and a separate black-out controller unit connectable to the harness.

Still another object of the invention is to a black-out controller system having special flashing features.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
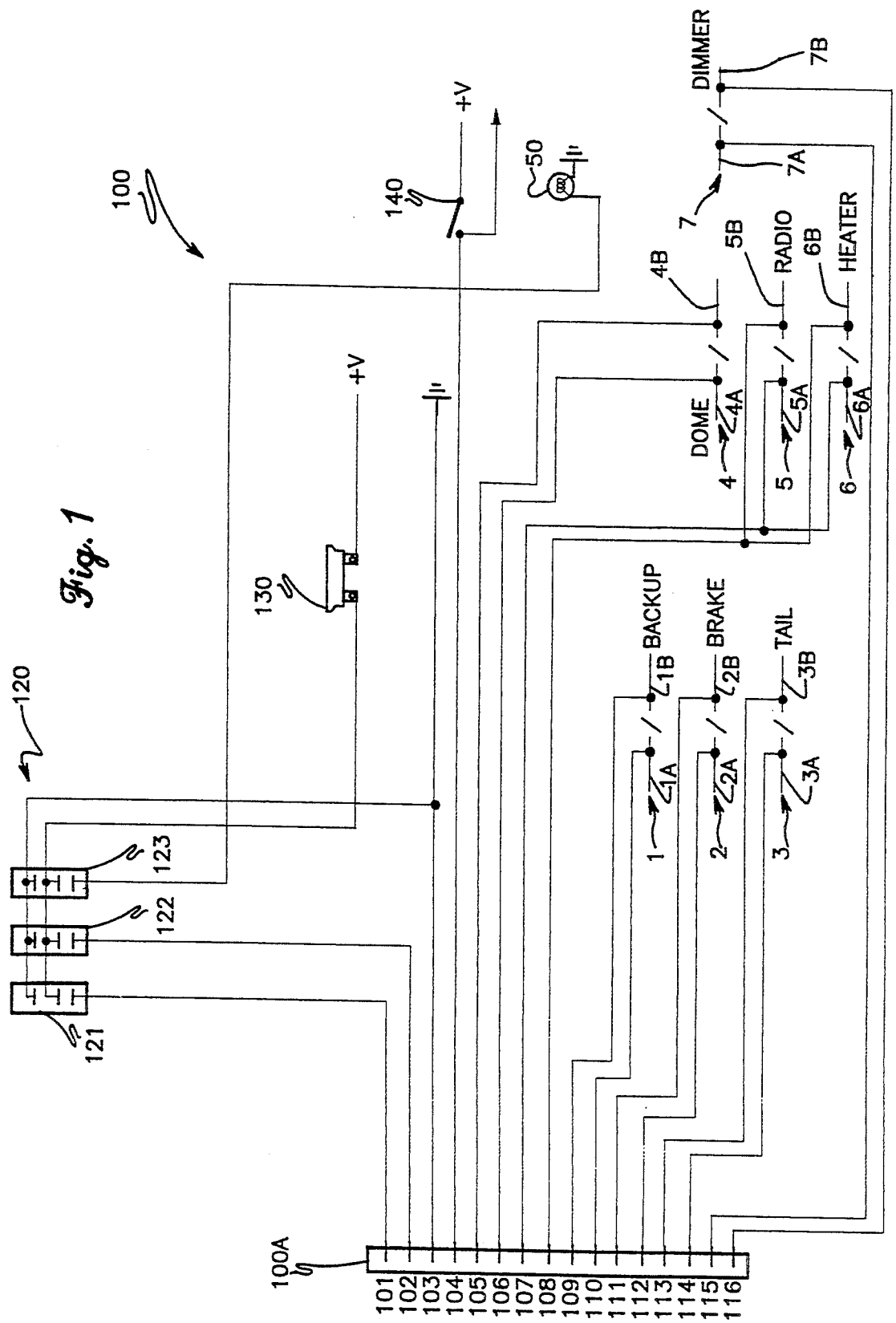
FIG. 1 is a wiring diagram for the wiring harness of the first embodiment of the present invention.

The wiring harness 100 as illustrated in FIG. 1 is designed to be connected to a conventional road vehicle wiring system. While there are a variety of road vehicle designs, there are certain required standards, as well as certain generally accepted standards, for most vehicles used on the road. For the purposes of the present invention, including all embodiments discussed below, a conventional vehicle wiring system will include a brake switch for supplying power to rear brake lights upon application of the brakes of the vehicle, a backup switch for supplying power to the backup lights upon activation of the reverse gear of the vehicle, a manually activated running light switch to provide, upon activation thereof, power to running lights, including the tail lights of the vehicle, a manually activated high beam switch to provide power to the high beams of the vehicle when activated, a manually activated turn signal switch for selectively activating the left turn signal and the right turn signal of the vehicle, and a dome light having a connection to the battery and the door switches for supplying a ground connection to the dome light upon opening a door, thereby allowing current to flow through the dome light causing the dome light to turn on when a door is opened. A headlight switch normally controls not only the headlights when activated fully, but also the running lights switch when activated partially or fully. The dash dimmer switch of the vehicle may also be controlled by the headlight switch.

The digital displays within the vehicle operate in two modes, a daytime mode and a nighttime mode. The automotive manufacturers provide this feature in their vehicles to allow the user to see the bright digital displays clearly during the daytime, while allowing the user to dim the displays in low light situations, such as at night. The digital displays of the radio and heater have a built in bright mode selector switch which shuts off when the running lights are turned on, thereby placing the digital displays in the nighttime mode in which the digital displays are dimmer than in the daytime mode. With the running lights off and the ignition switch on, the digital displays of the heater and radio are placed in the daytime mode and are brightly illuminated so as to be visible during the day.

The wiring harness 100 is designed to be installed in emergency vehicles, such as police squad cars. The wiring harness 100 is attached at one end to various parts of the electrical lighting system of the vehicle, and at the opposite end to a wire socket connector 100A. The wire socket connector 100A allows a black-out controller 200 to be connected thereto through the use of a wiring plug connector 200A as discussed below in conjunction with FIG. 2. The black-out controller 200 controls connections leading to the various light sources of the vehicle under the control of the user. In this manner, a user may control the various electrical connections of the vehicle leading to the various light sources.

More specifically, as shown in FIG. 1, the harness 100 includes connections to an illuminated switch panel 120 allowing a user to selectively and independently deactivate the tail, radio, and heater lights of the vehicle through the use of switch 121, deactivate the brake, dome, and backup lights of the vehicle through the use of switch 122, and turn on a sneak light 50 located in the front of the vehicle through the use of switch 123. The sneak light 50 produces less light than the headlights and is aimed down at the road at a greater angle than the headlights so as to provide only enough light for the driver to see directly in front of him a predetermined distane. Power is supplied to the illuminated switch panel through an inline fuse 130 having a connection to the positive end of the battery. A gound line is also connected to the switch panel 120. Each of the switches of the switch panel 120 is a single pull single throw on-off self-illuminating switch which selectively opens the contact, herein referred to as the off position of the switch, and closes the contact to connect the positive voltage of the battery therethrough, herein referred to as the on position of the switch.

As shown in FIG. 1, the wire socket connector 100A has sixteen (16) pin connections. The wire 3 of the vehicle leading from the running light switch to the running lights is cut and the side 3A coming from the running light switch is connected to pin 114, while the side 3B leading to the running lights is connected to pin 113. The wire 2 of the vehicle supplying power to the brake switch is cut and the side 2A supplying the power is connected to pin 112 while the side 2B leading to the brake switch is connected to pin 111. The wire 1 within the vehicle coming from the backup switch and leading to the backup lights is cut and the side 1A coming from the backup switch is connected to pin 110 while the side 1B going to the backup lights is connected to pin 109. The wire 4 coming from the dome light fuse to the interior dome light controlled by the door switch is cut. The side 4A of the wire 4 coming from the dome light fuse is connected to pin 106 and the other side 4B is connected to pin 105. Pin 104 is connected to the line providing power to the vehicle's emergency lights, hereafter referred to as reds. Upon activation of the red lights switch 140, power is supplied to pin 104. Pin 103 is connected to ground. The wire 5 leading to the radio digital display of the squad car from the running lights switch is cut and the side 5A leading to the radio is connected to pin 107. The wire 6 leads to the heater control switch display from the headlight switch of the vehicle. The wire 6 is cut and the side 6A leading to the heater control switch display is also connected to pin 107. Sides 5B and 6B are connected to the running light switch and lead to the bright mode selector switches of the radio and heater control displays. When power is supplied to the bright mode selector switches as the running lights are turned on, the digital displays are placed in their nighttime mode of operation. The power received by sides 5B and 6B are control signals only, placing the digital displays in their nighttime mode, but do not supply power to the displays. The actual power to light the digital displays when placed in the nighttime mode comes from wire 7. Wire 7 supplies power from the dash dimmer switch to the digital display lights so as to allow the driver to adjust the intensity of the digital display lights through the use of the dash dimmer switch. Wire 7 is cut so that side 7A leading from the dash dimmer switch is connected to pin 115 and side 7B leading to the digital display lights is connected to pin 116.

Figure 2:
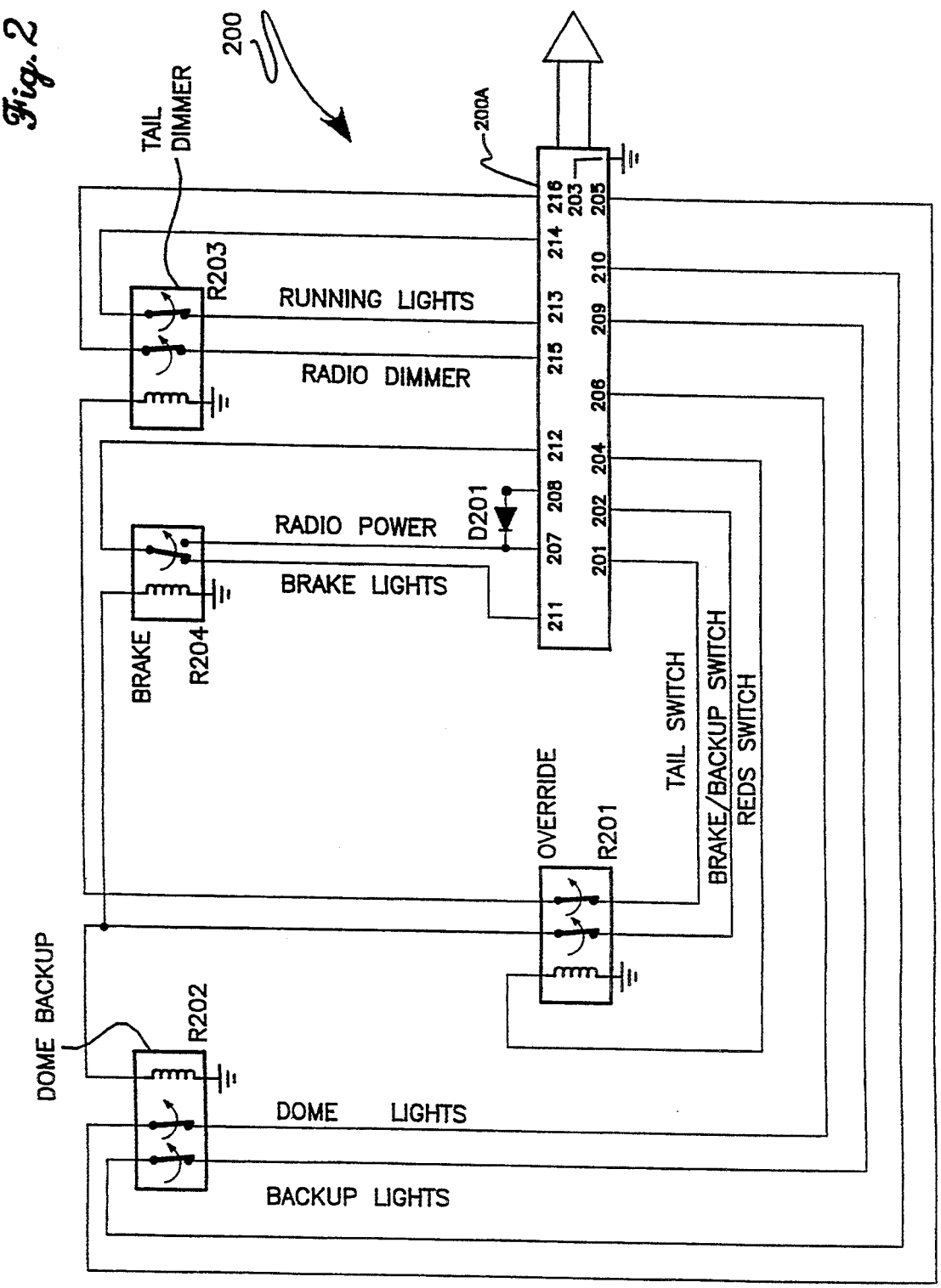
FIG. 2 is a schematic diagram for the black-out controller unit attachable to the wiring harness of the first embodiment of the present invention.

As shown in FIG. 2, the black-out controller 200 includes a wire plug connector 200A which connects to the wire socket connector 100A of the harness 100 wired to the vehicle, so as to provide a connection of pins 101 through 116 to pins 201 through 216, respectively. In this manner, the black-out controller 200 may be removed from the vehicle without having to disconnect the harness 100 by simply disconnecting the wire plug connector 200A from the wire socket connector 100A. With the wire plug connector 200A connected to the harness and all switches 121 through 122 of the illuminated switch panel 120 located in their off positions, the relay switches of the black-out controller 200 form the electrical connections of the vehicle prior to the installation of the harness 100.

More specifically, with all of the relays of the black-out controller 200 deactivated, both of the normally closed switches of the backup and dome lights black-out relay R202 are closed, thereby allowing the door switches to activate the dome or courtesy light since pins 205 and 206 are connected, and further allowing the activation of the backup lights since pins 209 and 210 are connected. Further, pins 211 and 212 are normally connected through a switch of the brake lights black-out relay R204 to allow the brake switch to activate the brake light. A tail and dimmer lights black-out relay R203 has two normally closed switches, one connecting pins 215 and 216 connecting sides 7A and 7B to allow power from the dash dimmer switch to reach the digital display lights. The other normally closed switch of the relay R203 connects pins 213 and 214, thereby allowing the tail lights to be activated by the running light switch.

With the black-out controller 200 attached to the wiring harness 100 as discussed above, the user can black-out certain lighting features of the vehicle. If the user turned on the tail and dimmer lights black-out switch 121, power is supplied to pin 101 connected to pin 201. With the black-out override relay R201 not activated, the switches of relay R201 remain in their normally closed positions. Thus the power from pin 201 is supplied to the relay coil of the tail and dimmer lights black-out relay R203. Pins 215 and 216 connecting pins 115 and 116 are thereby disconnected. In this manner, sides 7A and 7B are disconnected, thereby preventing the dash dimmer switch from supplying power to the digital displays of the radio and heater. Further, the running lights are disconnected since the switch connecting pins 213 and 214 is opened, thereby disconnecting pins 113 and 114, which in turn disconnects side 3A from 3B. Thus, the tail lights black-out switch 121 prevents the tail lights and the digital displays of the heater and radio from coming on.

As illustrated in FIGS. 1 and 2, if the user activated the brake lights black-out switch 122, both the dome and backup lights black-out relay R202 and the brake black-out relay R204 are activated. Power from pin 202 is supplied to the relay coil of the dome and backup lights black-out relay R202, causing the normally closed switches of the relay R202 to open. In this manner, the backup lights and the dome lights can not come on. Power from pin 202 is also supplied to the relay coil of the brake lights black-out relay R204, thereby redirecting power coming from side 2A, normally going to side 2B via pins 211 and 212 as discussed above, to sides 5A and 6A. Once power is supplied to sides 5A and 6A, the digital displays of both the radio and heater control are placed in their nighttime mode as discussed above. Note that power is allowed to flow from the running lights switch to the radio and heater lighting arrangements through the use of diode D201. However, the diode D201 prevents power from flowing to the running lights switch in order to prevent the running lights from being turned on by power coming from pin 211.

As stated above, the black-out controller system of the present invention is intended to be used in emergency vehicles, especially police squad cars. The black-out features of the first embodiments and the embodiments to follow render the vehicle less visible to others outside the vehicle. These black-out features should be used only by trained professionals who possess the necessary skill and discretion to use these features safely. Each switch of the illuminated switch display 120 is illuminated when activated in order to indicate to the driver that the black-out feature provided by the switch is being used. If the red lights switch 140 is turned on, power is supplied to pin 104 as discussed above, thereby providing power to the relay coil of the override relay R201 connected to pin 204 as shown in FIG. 2. Once the override relay R201 is activated, the normally closed switches thereof open. Therefore, even if one or both of the black-out switches 121 and 122 were activated, they would be overridden and the relays R202, R203, and R204 would provide connections for allowing the lighting features of the car to operate normally as discussed above.

Figure 3:
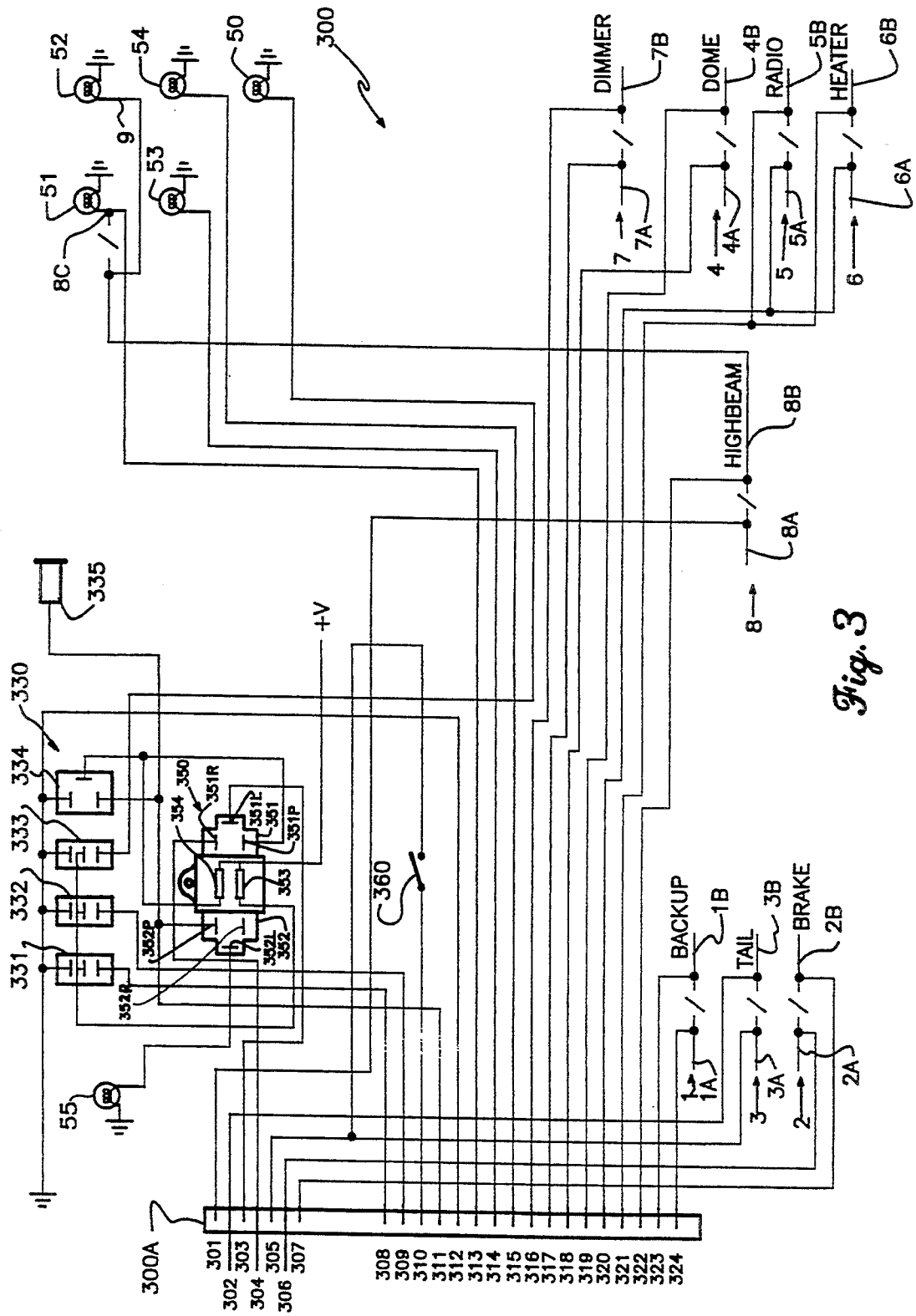
FIG. 3 is a wiring diagram for the wiring harness of the second embodiment of the present invention.
Figure 4:
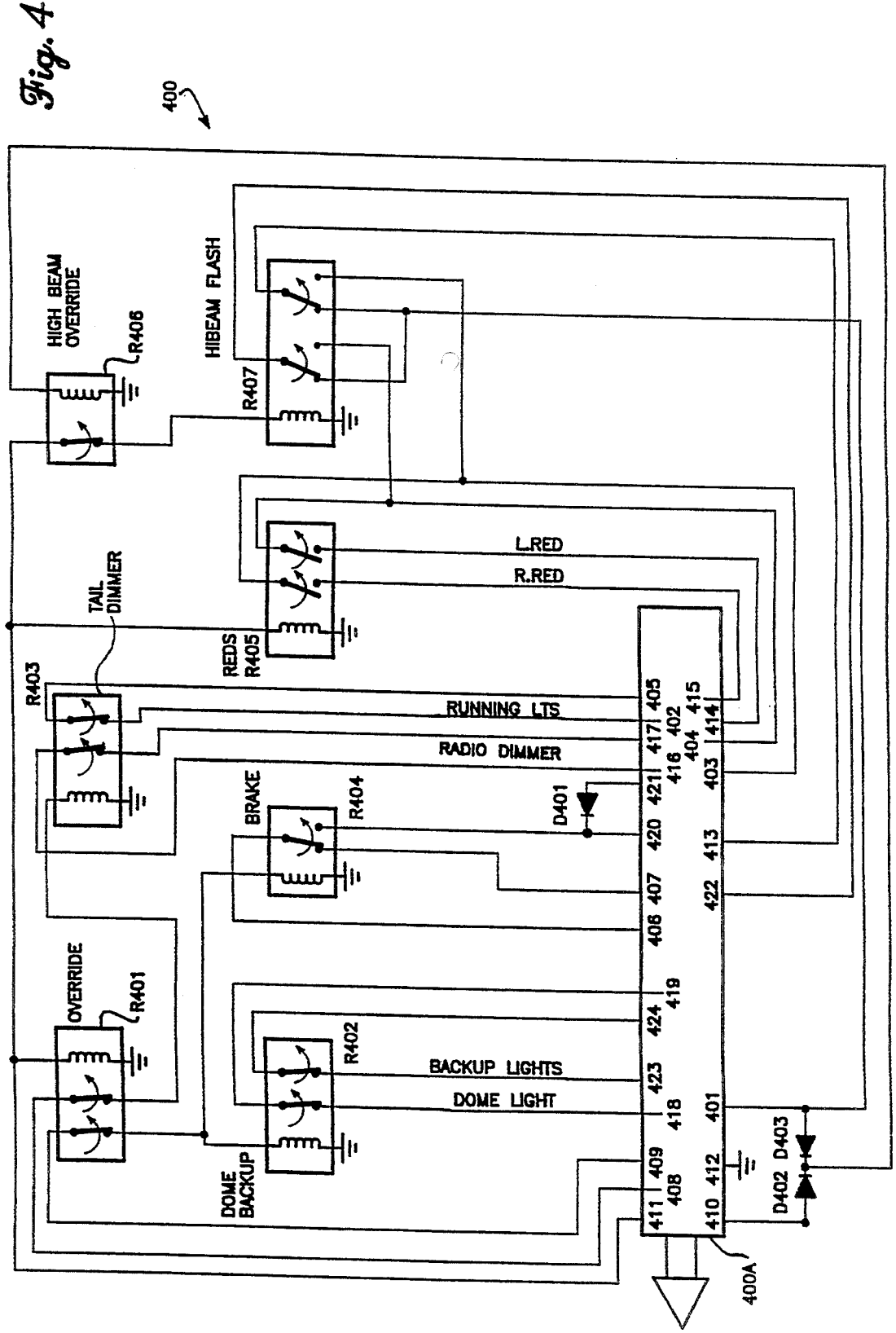
FIG. 4 is a schematic diagram for the black-out controller unit attachable to the wiring harness of the second embodiment of the present invention.

FIG. 3 illustrates the wiring harness 300 of the second embodiment for the black-out controller system of the present invention. The wiring harness 300, like the wiring harness 100 of the first embodiment, is connected to wires 1 through 7 of the vehicle; however, the pin connections are different. The wiring harness 300 has twenty-four (24) pin connections. The wire 1 within the vehicle is cut and side 1A is connected to pin 324 of the wire socket connector 300A. Side 1B is connected to pin 323. The wire 2 is cut and side 2A is connected to pin 306 while side 2B is connected to pin 307. Likewise, wires 3, 4, 5, 6 and 7 are cut with sides 3A, 3B, 4A, 4B, 7A, and 7B being connected to pins 305, 302, 318, 319, 317, and 316, respectively. Both sides 5A and 6A are connected to pin 320, while sides 5B and 6B are both connected to pin 321. The cuts in the wires 1 through 7 are made at the same locations as described in the first embodiment above.

In addition to the wires 1 through 7 of the vehicle, the harness 300 is connected to the high beams of the vehicle. A wire 8 leads to a left side high beam light 51. A wire 9 is connected to wire 8 to provide power to the right side high beam 52. The wire 8 is cut into three (3) sections. Section 8A is connected to the pin 301 and leads to the high beam switch, section 8B is connected to pin 322 and leads to the high beam 52 via line 9, and section 8C is connected to pin 313 and leads to high beam 51. Unlike the first embodiment, the harness 300 is connectable to the reds of the vehicle located either in front of the grill or in front of the radiator behind the grill. One of the grill reds is on the right side and the other is on the left side. The left side grill red 53 is connected to pin 314 and the right side grill red 54 is connected to pin 315. The reds are activated through the use of red lights switch 334. Red lights switch 334 is part of the illuminated switch panel 330, as are the tail lights black-out switch 331, the brake lights black-out switch 332, and the sneak light switch 333. As in the first embodiment with switch 121, the tail lights black-out switch 331 disables the tail, radio, and heater lights of the vehicle. Likewise, the brake lights black-out switch 332 disables the brake, backup, and dome lights. The sneak light switch 333 turns on the sneak light 50 in front of the vehicle.

The harness 300 also has a conventional flasher unit 350 having two flashers 351 and 352 connected thereto along with two fuses 354 and 353. The conventional flasher unit 350 is any typical flasher unit used in vehicles, such as those made by Packard Electric. The flasher 352 may be any conventional flasher used in the conventional flasher unit 350, such as flasher Wagner 552. Since the flasher 351 uses two outputs, model Dominion 743100 may be used.

The positive end of the battery supplies power to the fuses 353 and 354. The fuse 354 has a higher current level rating than the fuse 353 and is used to supply the flashers 351 and 352. The larger fuse 354 passes current to the flasher 351. The smaller fuse 353 passes current to the black-out switches 331, 332, and 333. The larger fuse 354 passes current to the red lights switch 334 when activated. The red light switch 334 provides power to pin 311, to the flasher 352, and to a power outlet socket 335 as will be described in greater detail below.

The black-out controller 400 has a wire plug connector 400A capable of being connected to the wire socket connector 300A. When the wire socket connector 300A is plugged into the wire plug connector 400A, each of the pins 301 through 324 of the wiring harness 300 is connected to each of the pins 401 through 424 of the black-out controller 400, respectively. As in the first embodiment, with all of the relays of the black-out controller 400 deactivated, the electrical connections of the vehicle are identical to those prior to the installation of the harness 300.

When the brake lights black-out switch 332 is activated, power is supplied to the relay coil of the brake lights black-out relay R404 via pin 309, pin 409, and the black-out override relay R401. Once the relay R404 is activated, pin 406 is connected to pin 420 instead of pin 407, thereby redirecting power coming from side 2A to sides 5A and 6A instead of side 2B. Once power is supplied to sides 5A and 6A, the digital displays of both the radio and heater control are placed in their nighttime mode as discussed above. Note that power is allowed to flow from the running lights switch to the radio and heater lighting arrangements through the use of diode D401. However, the diode D401 prevents power from flowing to running light switch in order to prevent the running lights from being turned on by power coming from pin 306. The brake lights of the vehicle will not come on as the driver hits the brake pedal, but the power that is normally supplied to the brake switch is routed to place the digital displays of the radio and heater display in the nighttime mode of operation.

The backup and dome lights relay R402 is also activated once the brake lights switch 332 is turned on with the switches of the black-out override relay R401 closed. Upon activation of relay R402, pins 418 and 419 connecting sides 4A and 4B of wire 4 are disconnected thereby preventing the dome or courtesy light from coming on. Also, pins 423 and 424 are disconnected preventing power coming from side 1A leading from the backup switch from being supplied to side 1B leading to the backup lights.

When the tail lights black-out switch 331 is activated, power is supplied to relay coil of the tail lights black-out relay R403. When the relay R403 is activated, pins 416 and 417 are disconnected, thereby disconnecting the sides 7A and 7B so as to prevent power from the dash dimmer switch from powering the digital displays of the radio and heater. Further, pins 405 and 402 are disconnected so as to disconnect sides 3A and 3B of wire 3, thereby preventing power from reaching the running lights.

With the reds switch 334 activated power is supplied to the flasher 352 via an input 352P as well as to the power outlet socket 335 and pin 311. The power supplied to pin 311 is used to activate the relay coils of the black-out override relay R401, the reds flasher relay R405, and the highbeam flasher relay R407. With the black-out override relay R401 activated, the black-out relays R402, R404, and R403 can not be activated, or are deactivated if they have already been activated. In this manner, the brake lights, backup lights, and tail lights function normally.

Flasher 351 has an output 351R connected to pins 304 and an output 351L connected to pin 303. The outputs 351R and 351L alternately share the power supplied by the input 351P of the flasher 351. In this manner, power is supplied to pin 303 half of the time and to pin 304 the other half of the time. With relays R405 and R407 activated, the left highbeam headlight 51 is controlled by the flasher 351. The right grill red 54 is also controlled by the flasher 351. The right highbeam headlight 52 along with the left grill red 53 is controlled by the flasher 351. In this manner, the right grill red 54 and the right highbeam headlight 52 alternately flash as do the left grill red 53 and the left highbeam headlight 51. A conventional wigwag effect of the lights is produced since the right grill red 54 and left highbeam headlight 51 are on at the same times and alternate with the left grill red 53 along with the right highbeam headlight 52, also on at the same times. The flasher 352 has an output 352L connected to a conventional elevated amber light 55 located in the passenger compartment of the vehicle next to the back window. In this manner the elevated amber light also flashes when the reds are placed on.

The black-out controller 400 includes a highbeam override relay R406 for preventing the power from the red lights switch 334 from reaching the relay coil of the relay R407. With the relay R407 maintained in its deactivated state, pin 401 leading to the highbeam switch is connected to pins 422 and 413, leading to the left high beam 51 and the right high beam 52, respectively. Thus, the highbeam switch of the vehicle operates the high beams in the normal fashion. Note, that the relay R405 may still be energized, allowing the flasher 351 to alternately flash the left and right grill reds even with the highbeam override relay R406 activated.

The highbeam override relay R406 is activated by the high beam switch through power supplied thereby to pin 301, leading to pin 401, leading to diode D403 which allows power to pass from pin 401 to the relay coil of relay R406. The highbeam override relay R406 is also activated by a night time highbeam override switch 360 which, when activated, supplies power normally going to the switch from side 3A of wire 3 to pin 310 and 410. Diode D402 allows the power coming from pin 410 of the wire plug connector to pass to the coil of the relay R406, thereby disabling the relay R407. Note that the diode D403 also prevents power from side 3A of wire 3 from passing to pin 401, and diode D402 prevents power from the highbeam switch coming from pin 401 from passing to pin 410, thus isolating pins 401 and 410 from each other.

Figure 5:
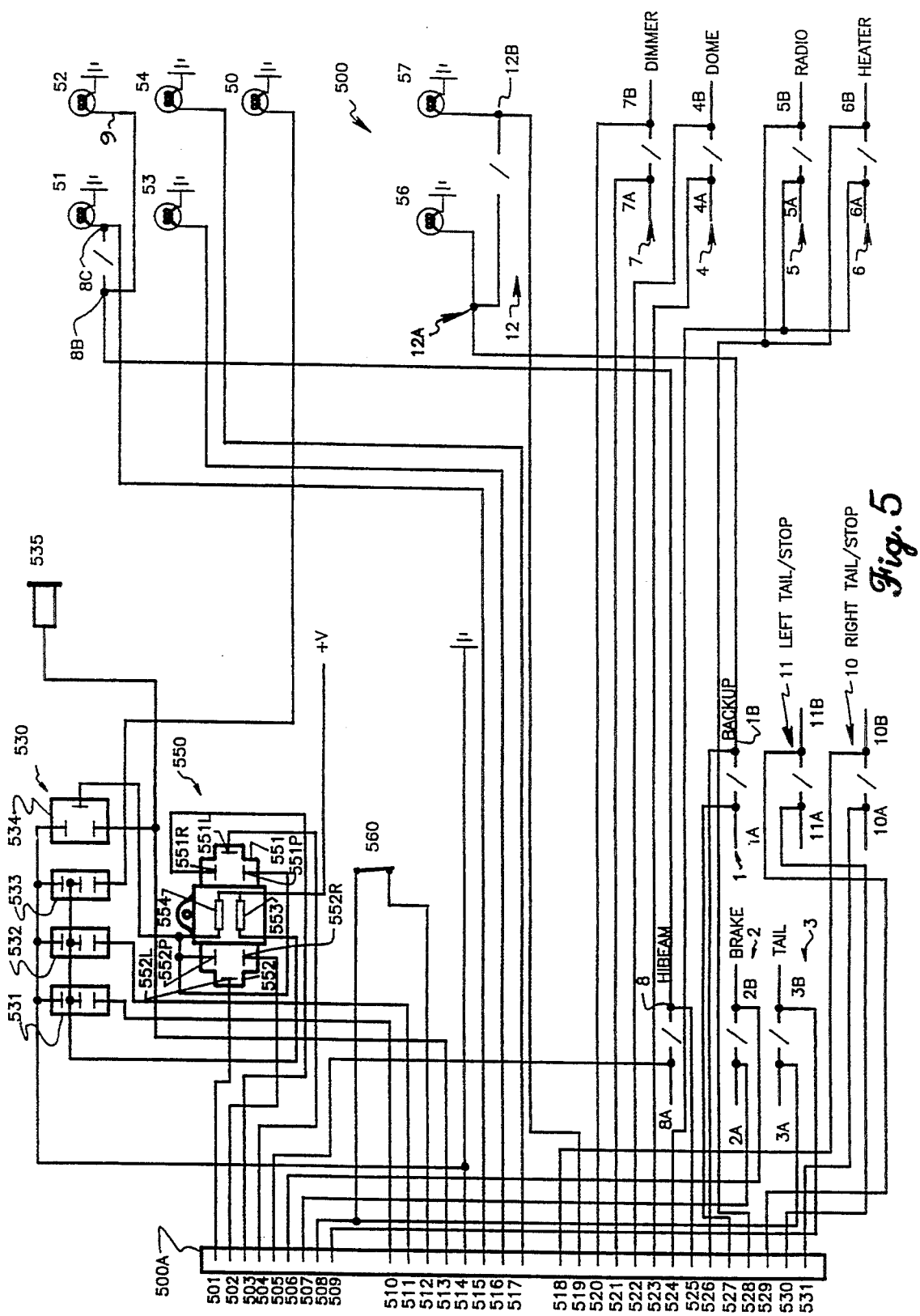
FIG. 5 is a wiring diagram for the wiring harness of the third embodiment of the present invention.
Figure 6:
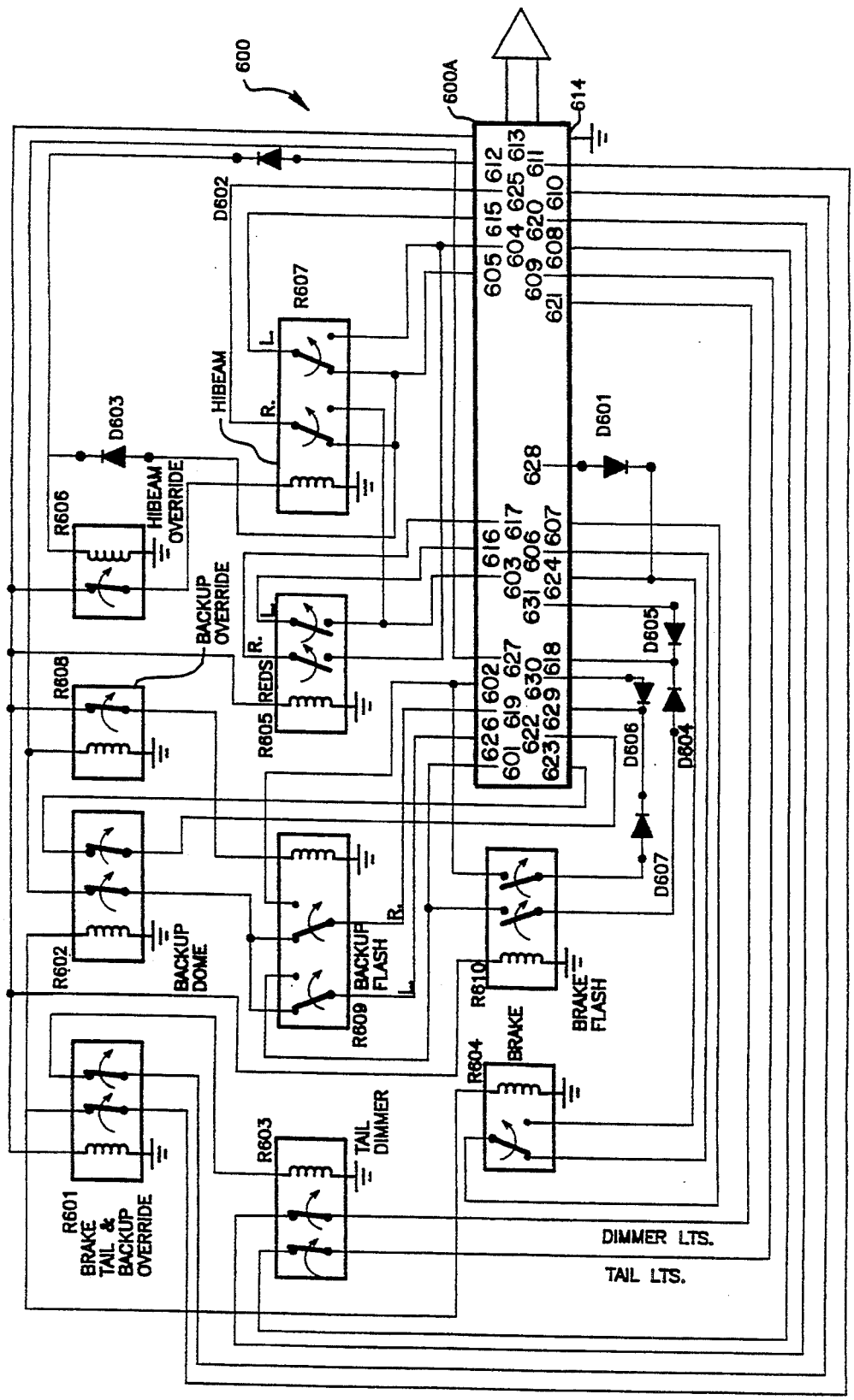
FIG. 6 is a schematic diagram for the black-out controller unit attachable to the wiring harness of the third embodiment of the present invention.

A third embodiment for the black-out controller system of the present invention is illustrated in FIGS. 5 and 6. The third embodiment is similar to the second embodiment; however, the third embodiment includes a wigwag flasher arrangement for the backup lights and tail lights and omits the flasher arrangement for the elevated amber light 55. As shown in FIG. 5, the wiring harness 500 has a wire socket connector 500A attached at one end thereof, and is connected to the electrical lighting system of the vehicle at the other. Like the wiring harness 300 of the second embodiment, the wiring harness 500 is connected to wires 1 through 9 of the vehicle. The wires are cut as described in the second embodiment above, and sides 1A, 1B, 2A, 2B, 3A, 3B, 4A, 4B, both 5A and 6A, both 5B and 6B, 7A, 7B, 8A, and both 8B and 9 are connected to pins 527, 526, 507, 506, 508, 509, 523, 522, 524, 528, 521, 520, 505, and 525, respectively.

In the third embodiment of the wiring harness 500, the wire 12 connecting the right backup light 57 in parallel with the left backup light 56 is cut to produce two sides of the wire 12. Side 12A of the wire 12 leads back to the left backup light 56 and side 12B of the wire 12 leads back to the right backup light 57. Side 12A is not used and should be taped at the end and placed out of the way. Side 12B is connected to pin 519. Two additional wires of the turn signals within the steering column are also cut. A wire 11 leading from the turn signal switch to the left rear turn signal and stop light is cut and a side 11A leading from the turn signal switch is connected to pin 530, while the other side 11B leading to the left rear turn signal and stop light is connected to pin 529. A wire 10 leading from the turn signal switch to the right rear turn signal and stop light is also cut. A side 10A of the wire 10 leading from the turn signal switch is connected to pin 531, while the side 10B of the wire 10 leading to the right read turn signal and stop light is connected to pin 518.

With the additional individual connections of the wiring harness 500 to the right and left backup lights and the right and left signal lights, a wigwag effect of the backup and signal lights is achieved. This is accomplished by using a conventional flasher unit 550. The flasher unit 550 uses conventional flasher 551 and 552, both of which may be model Dominion 743100 since they each have two outputs. The flasher unit 550 has two fuses 554 and 553. Fuse 554 has a higher amperage rating than fuse 553, and is used to power the flashers 551 and 552 of the flasher unit 550 under the control of an illuminated switch panel 530 as discussed below. Fuse 553 controls the black-out relays of the black-out controller 600 as discussed below.

The illuminated switch panel 530 is the same type of switch panel as illuminated switch panel 330 discussed above. The illuminated switch panel 530 has a tail lights black-out switch 531 connected to pin 510, a brake lights black-out switch 532 connected to pin 511, a sneak light switch 533 for controlling the sneak light 50, and a red lights switch 534 connected to pin 513 for controlling the flashing arrangements of the third embodiment of the present invention by selectively providing power to power outlet socket 535.

As shown in FIG. 6, the black-out controller 600 has similar black-out features as black-out controller 400. Each of the pins 501–531 of the wiring harness 500 is connected to each of the pins 601–631 of the black-out controller 600, respectively. More specifically, the tail lights and the radio and heater control display dimmer lights are controlled by tail/dimmer black-out relay R603. Relay R603 normally provides a connection between the running light switch and the running lights through a normally closed switch connecting pins 608 and 609. The relay R603 also normally provides a connection between the dash dimmer switch and the radio and heater control display lights through a normally closed switch connecting pins 621 and 620. The backup and dome relay R602 controls the connections between the two backup lights 56 and 57, connected to pin 626 and 619, respectively, and the dome or courtesy light connected to pin 622. The backup lights flasher relay R609 is used to connect the left backup light 56 and! the right backup light 57 to the flasher 552 via pin connection 601 leading to the output 552L of the flasher 552 and pin connection 02 leading to the output 552R of the flasher 552, respectively.

The brake lights are also connected to flasher 552 via pin connections 601 and 602. Further, brake black-out relay R604 is used to black-out the brake lights upon the activation of the brake lights black-out switch 532 connected to pin 611. Power supplied to pin 611 activates the relay R604 so as to disconnect the connection made between pin 606 and 607, which disconnects sides 2A supplying power to the brake switch from side 2B leading to the brake lights switch. The power from side 2A is supplied to pin 624 instead leading to sides 5A and 6A to place the digital displays of the radio and heater control in their nighttime mode of operation as discussed with the other embodiments above. A diode D601 allows power from sides 5B and 6B coming from the running light switch to go to sides 5A and 6A, while preventing the power supplied from side 2A from being fed into the running light switch which would turn the running lights on. Note that a black-out override relay R601, deactivates the black-out features of the black-out controller 600 in the same manner as R401 discussed above.

The flasher features of the black-out controller 600 are similar to those of black-out controller 400. Relay R605 connects the grill reds 53 and 54 to the flasher unit 550 when activated in the same manner as R405 of the controller 400 connects the grill reds 53 and 54 to the flasher unit 350. Relay R607 connects the high beams 51 and 52 to the flasher unit 550 in the same manner as R407 of the controller 400 connects the high beams 51 and 52 to the flasher unit 350 when activated.

Each flasher 551 and 552 has one input for power and two outputs. Flasher 551 is connected to the power from fuse 554 via input 551P and flasher 552 is connected to the power from fuse 554 via input 552P. Flasher outputs 551L, 551R, 552R, and 552L are connected to pins 504, 503, 502, and 501, respectively. As shown in FIG. 6, these pins lead to open connections to the various relays controlling the flashing features. Thus the flashers 551 and 552 are not activated since they are not connected to lights.

With the activation of the red lights switch 534, power is supplied to pin 613 of the wiring plug connector 600A. This power activates the relay coil of the black-out override relay R601 to deactivate the black-out features of the controller 600 as discussed above. Further, the highbeam relay R607 is activated through the normally closed switch of relay R606, the backup flash relay R609 is activated through the normally closed switch of relay R608, the reds relay R605 is activated and the brake flash relay R610 is activated. In this manner, the connection to the left high beam light 51 through pin 615 is changed to pin 604 leading to the output 551L as controlled by relay R607, while the connection to the right high beam 52 through pin 625 is changed to pin 603 leading to output 551R. Likewise, the outputs 551L and 551R are connected to pins 616 and 617, respectively, through the activation of the reds relay R605. Pins 616 and 617 lead to the left grill red 53 and the right grill red 54, respectively. Thus, through the use of relays R605 and R607, the same wigwag effect of the highbeams 51 and 52 along with the grill reds 53 and 54 is achieved through controller 600 as is achieved through controller 400, described above.

The high beam override relay R606 overrides the high beam flasher function upon activation of the high beam switch supplying power to pin 605, which passes through the diode D603 and proceeds to energize the coil of relay R606. Further, the relay R606 may also be energized upon activation of the running lights which supplies power to pin 612 passing through diode D602 upon activation of the running lights as long as the switch 560 is closed. Diode D602 prevents power from the high beam switch from being channeled to the running lights switch and diode D603 prevents power from the running light switch from reaching the output of the high beam switch. The switch 560 allows the driver the discretion of whether or not to deactivate the high beam flasher feature at night when the running lights would normally be on.

With the activation of relays R609 and R610 a wigwag effect is produced between the back-up lights and the brake lights. The relay R609 connects the left backup light 56 to the output 552L by connecting pins 626 to pin 601. The relay R610 connects the right rear turn signal to the output 552L by connecting pin 618 to pin 601. Likewise, through relays R609 and R610, the right backup light 57 connected to pin 619 and the left rear turn signal connected to pin 629 is connected to the output 552R. In this manner, the left backup light 56 and the rear right turn signal are simultaneously on for half of the time and the right backup light 57 and the rear left turn signal are simultaneously on for the other half of the time. This produces the wigwag effect for the brake lights and backup lights.

The power supplied to the right rear turn signal from the turn signal switch via pin 631 goes through the diode D605 to the right rear tail light via pin 618. The diode D605 prevents the power from the output 552L of the flasher 552 from going to the turn signal switch. The diode D604 allows the power from output 552L to go to pin 618, while preventing the power from the right turn signal switch passing through the diode D604 from going to the backup flash relay R609 when the brake flash relay R610 is activated. The diode D606 prevents the power from the output 552R coming from the activated relay R610 from going to the turn signal switch. The diode D607 allows the power from output 552R to go to pin 629 leading to the left rear turn signal while preventing the power from the turn signal switch coming from pin 630 from going to relay R609 through the activated relay R610.

It is to be understood that the present invention is not limited to the embodiments described above, but encompasses any and all embodiments within the scope of the following claims.

I claim:

1. A black-out controller system for use in an emergency vehicle having emergency lights, a backup switch for supplying power to backup lights of the vehicle when the vehicle is placed in reverse, a manually activated running light switch to provide power to running lights of the vehicle including tail lights, a dome light activated by opening doors, and a brake switch for supplying power to brake lights of the vehicle when a brake pedal within the vehicle is engaged, said black-out controller system comprising:

a manually activated emergency light switch for supplying power to the emergency lights of the vehicle;

a manually activated tail lights black-out switch;

a manually activated brake and backup light black-out switch;

tail lights black-out means for blocking the power supplied to the tail lights by the running light switch in response to the activation of said manually activated tail lights black-out switch;

brake lights black-out means for blocking the power supplied to the brake lights by the brake switch in response to the activation of said manually activated brake and backup lights black-out switch;

backup lights black-out means for blocking the power supplied to the backup lights by the backup switch in response to the activation of said manually activated brake and backup lights black-out switch; and black-out override means for disabling said tail lights black-out means, said brake lights black-out means, and said backup lights black-out means upon activation of the manually activated emergency light switch.

2. A black-out controller system as claimed in claim 1, wherein said manually activated tail lights black-out switch includes means for illuminating said manually activated tail lights black-out switch upon activation thereof.

3. A black-out controller system as claimed in claim 2, wherein said manually activated emergency light switch is illuminated upon activation thereof.

4. A black-out controller system as claimed in claim 1, wherein the vehicle further includes an ignition switch, a headlight switch, a radio display having a digital readout and a heater control display having a digital readout, said digital readout of said radio display and said digital readout of said heater control display are operable in a daytime mode, being fully illuminated upon activation of said ignition switch, said digital readout of said radio display and said digital readout of said heater control display are also operable in a nighttime mode, being partially illuminated upon activation of said running lights switch, said brake lights black-out means including means for placing said digital readout of said radio display and said readout of said heater control display in said nighttime mode of operation and said tail lights black-out means including means for cutting power going to said digital readout of said radio display and said readout of said heater control display.

5. A black-out controller system as claimed in claim 1, wherein said emergency vehicle further includes a highbeam headlight switch to activate right and left high beam headlights, a front grill, said emergency lights including right and left side emergency red lights located behind or in front of said front grill of the vehicle, said black-out controller system further comprising front wigwag flasher means activated upon the activation of said manually activated emergency light switch for alternately flashing the right high beam headlight in unison with the left side red light and the left high beam headlight in unison with the right side red light.

6. A black-out controller system as claimed in claim 5, further including a high beam override feature for deactivating said front wigwag flasher means in response to the activation of said high beam headlight switch.

7. A black-out controller system as claimed in claim 6, further including a manually activated front wigwag flasher override switch for deactivating said front wigwag flasher means upon activation of the running lights switch.

8. A black-out controller system as claimed in claim 1, wherein said brake lights include left and right brake lights and said backup lights include left and right backup lights, said black-out controller system further comprising a rear wigwag flasher means activated upon the activation of said manually activated emergency light switch for alternately flashing the right tail light in unison with the left backup light, and the left tail light in unison with the right backup light.

* * * * *